United States Patent
Wang et al.

(10) Patent No.: US 10,264,063 B2
(45) Date of Patent: Apr. 16, 2019

(54) METHOD AND APPARATUS FOR SCHEDULING CLOUD SERVER

(71) Applicant: BEIJING BAIDU NETCOM SCIENCE AND TECHNOLOGY CO., LTD., Beijing (CN)

(72) Inventors: Jiaxing Wang, Beijing (CN); Kai Zhou, Beijing (CN); Faen Zhang, Beijing (CN); Qian Wang, Beijing (CN); Yuanhao Xiao, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 302 days.

(21) Appl. No.: 15/429,386

(22) Filed: Feb. 10, 2017

(65) Prior Publication Data
US 2018/0084039 A1 Mar. 22, 2018

(30) Foreign Application Priority Data
Sep. 18, 2016 (CN) .......................... 2016 1 0828411

(51) Int. Cl.
G06F 15/173 (2006.01)
H04L 29/08 (2006.01)
G06F 9/50 (2006.01)

(52) U.S. Cl.
CPC ........ *H04L 67/1023* (2013.01); *G06F 9/5083* (2013.01); *H04L 67/1095* (2013.01); *H04L 67/32* (2013.01)

(58) Field of Classification Search
USPC ....... 709/203, 206, 217, 219, 223, 224, 226, 709/228, 230, 232, 238; 718/1; 370/252
See application file for complete search history.

(56) References Cited

U.S. PATENT DOCUMENTS

| 8,275,885 | B2* | 9/2012 | Hu | .......................... H04L 51/00 709/217 |
| 8,484,348 | B2* | 7/2013 | Subramanian | .......... H04L 41/50 709/223 |
| 9,014,034 | B2* | 4/2015 | Frey | ...................... H04L 43/026 370/252 |

(Continued)

FOREIGN PATENT DOCUMENTS

| CN | 103092326 A | 5/2013 |
| CN | 103533086 A | 1/2014 |
| KR | 20150121891 A | 10/2015 |

*Primary Examiner* — Quang N Nguyen
(74) *Attorney, Agent, or Firm* — Lathrop Gage LLP

(57) ABSTRACT

The present disclosure provides a method and apparatus for scheduling a cloud server. A specific implementation mode of the method comprises: monitoring whether current time is in a first pre-set time period; in response to the monitoring that the current time is in the first pre-set time period, scheduling a cloud server in a first cloud server cluster having a running state being an idle state, as a target cloud server, to a second cloud server cluster, so that the target cloud server executes a task obtained by the second cloud server cluster; monitoring whether the current time is in a second pre-set time period; in response to the monitoring that the current time is in the second pre-set time period, rescheduling the target cloud server to the first cloud server cluster, so that the target cloud server executes a task obtained by the first cloud server cluster.

12 Claims, 5 Drawing Sheets

(56) References Cited

U.S. PATENT DOCUMENTS

| | | | |
|---|---|---|---|
| 9,189,355 B1* | 11/2015 | Moturu | G06F 11/301 |
| 9,749,174 B1* | 8/2017 | Goff | H04L 29/08153 |
| 2013/0116044 A1* | 5/2013 | Schwartz | A63F 13/12 |
| | | | 463/29 |
| 2014/0019965 A1* | 1/2014 | Neuse | G06F 9/45533 |
| | | | 718/1 |
| 2014/0019966 A1* | 1/2014 | Neuse | G06F 9/45533 |
| | | | 718/1 |
| 2014/0115176 A1* | 4/2014 | Kamboh | H04L 67/142 |
| | | | 709/228 |
| 2015/0178137 A1* | 6/2015 | Gordon | H04L 67/1008 |
| | | | 709/226 |

\* cited by examiner

METHOD AND APPARATUS FOR SCHEDULING CLOUD SERVER

CROSS-REFERENCE TO RELATED APPLICATION

This application claims the priority of Chinese Patent Application No. 201610828411.9, entitled "Method and Apparatus for Scheduling Cloud Server," filed on Sep. 18, 2016, the content of which is incorporated herein by reference in its entirety.

TECHNICAL FIELD

The present disclosure relates to the technical field of computers, particularly to the technical field of cloud computing, and more particularly to a method and apparatus for scheduling a cloud server.

BACKGROUND

At present, to save deployment, operation and maintenance cost and human cost, many Internet companies generally choose to lease a cloud server cluster instead of building their own computer rooms, and use the leased cloud server cluster to build desired systems such as a mail service system, an E-commerce system, a big data computing system.

As for the system deployment, the current practice usually deploys different systems to the same cloud server cluster, or different systems to different cloud server clusters. Although the current deployment methods enable the systems as built to operate normally, they also have following defects: deploying different systems to the same cloud server cluster likely causes competition for resources such as CPU (Central Processing Unit) and memory, and very likely affects the stable operation of the systems; deploying different systems to different cloud server clusters requires the lease of the corresponding cloud server cluster based on the maximum access amount of the respective systems. However, the access amount of some systems has a notable on-peak/off-peak phenomenon, for example, service systems such as E-commerce system and mail system have very few visits in the early morning, when it is quite likely the cloud server resources are wasted.

SUMMARY

An object of the present disclosure is to provide an improved method and apparatus for scheduling a cloud server to solve technical problems mentioned in the above Background.

In a first aspect, the present disclosure provides a method for scheduling a cloud server, the method comprising: monitoring whether current time is in a first pre-set time period; scheduling, in response to the monitoring the current time being in the first pre-set time period, a cloud server in a first cloud server cluster having a running state being an idle state, as a target cloud server to a second cloud server cluster, so that the target cloud server executes a task obtained by the second cloud server cluster; monitoring whether the current time is in a second pre-set time period; rescheduling, in response to the monitoring that the current time is in the second pre-set time period, the target cloud server to the first cloud server cluster, so that the target cloud server executes a task obtained by the first cloud server cluster.

In some embodiments, scheduling, in response to the monitoring that the current time is in the first pre-set time period, a cloud server in a first cloud server cluster having a running state being an idle state, as a target cloud server, to a second cloud server cluster, so that the target cloud server executes a task obtained by the second cloud server cluster comprises: before scheduling the target cloud server to the second cloud server cluster, stopping running the target cloud server, determining whether to back up a current running environment of the target cloud server, and if yes, backing up the current running environment of the target cloud server; after scheduling the target cloud server to the second cloud server cluster, activating the target cloud server, and configuring a desired running environment to execute a task obtained by the second cloud server cluster.

In some embodiments, the target cloud server performs network communication with original cloud servers in the second cloud server cluster in a first network segment, and the original cloud servers in the second cloud server cluster perform network communication in a second network segment.

In some embodiments, after scheduling the target cloud server to the second cloud server cluster, activating the target cloud server, and configuring a desired running environment to execute a task obtained by the second cloud server cluster comprises: determining whether to activate an IP forwarding function on the target cloud server; in response to determining that the IP forwarding function has not been activated on the target cloud server, activating the IP forwarding function on the target cloud server, and when the target cloud serer accesses original cloud servers in the second cloud server cluster by accessing the IP address in the second network segment, redirect a data packet received by the accessed IP address to a corresponding IP address in the first network segment.

In some embodiments, rescheduling, in response to the monitoring that the current time being in the second pre-set time period, the target cloud server to the first cloud server cluster, so that the target cloud server executes a task obtained by the first cloud server cluster comprises: before rescheduling the target cloud server to the first cloud server cluster, determining whether to back up a current running environment of the target cloud server, and if yes, backing up the current running environment of the target cloud server; after rescheduling the target cloud server to the first cloud server cluster, activating the target cloud server, and restoring the current running environment of the target cloud server to the backup running environment or re-configuring the current running environment of the target cloud server.

In some embodiments, before monitoring whether current time is in the first pre-set time period, the method further comprises: storing, upon deploying systems on the first cloud server cluster and the second cloud server cluster, IP addresses and host names of the cloud servers in the first cloud server cluster and the second cloud server cluster in an associated fashion in relevant system files in the respective cloud servers in the first cloud server cluster and the second cloud server cluster.

In a second aspect, the present disclosure provides an apparatus for scheduling a cloud server, comprising: a first monitoring unit configured to monitor whether the current time is in a first pre-set time period; a first scheduling unit configured to, schedule, in response to the monitoring that the current time being in the first pre-set time period, a cloud server in a first cloud server cluster having a running state being an idle state, as a target cloud server, to a second cloud server cluster, so that the target cloud server executes a task obtained by the second cloud server cluster; a second monitoring unit configured to monitor whether the current time is in a second pre-set time period; a second scheduling unit configured to, reschedule, in response to the monitoring that the current time is in the second pre-set time period, the target cloud server to the first cloud server cluster, so that the target cloud server executes a task obtained by the first cloud server cluster.

In some embodiments, the first scheduling unit comprise: a first backup subunit configured to, before scheduling the target cloud server to the second cloud server cluster, stop running the target cloud server, and determine whether to back up a current running environment of the target cloud server, and if yes, backup the current running environment of the target cloud server; a first configuration subunit configured to, after scheduling the target cloud server to the second cloud server cluster, activate the target cloud server, and configure a desired running environment to execute a task obtained by the second cloud server cluster.

In some embodiments, the target cloud server performs network communication with original cloud servers in the second cloud server cluster in a first network segment, and the original cloud servers in the second cloud server cluster perform network communication in a second network segment.

In some embodiments, the first configuration subunit comprises: a determining module configured to determine whether to activate an IP forwarding function on the target cloud server; an IP forwarding module configured to, in response to determining that the IP forwarding function has not been activated on the target cloud server, activate the IP forwarding function on the target cloud server, and when the target cloud serer accesses original cloud servers in the second cloud server cluster by accessing the IP address in the second network segment, redirect a data packet received by the accessed IP address to a corresponding IP address in the first network segment.

In some embodiments, the second scheduling unit comprises: a second backup subset configured to, before rescheduling the target cloud server to the first cloud server cluster, determine whether to back up a current running environment of the target cloud server, and if yes, back up a current running environment of the target cloud server; a second configuration subunit configured to, after rescheduling the target cloud server to the first cloud server cluster, activate the target cloud server, and restore the current running environment of the target cloud server to the backup running environment or re-configure the current running environment of the target cloud server.

In some embodiments, the apparatus further comprises: a storage unit configured to store IP addresses and host names of cloud servers in the first cloud server cluster and the second cloud server cluster in an associated fashion in relevant system files in respective cloud servers in the first cloud server cluster and the second cloud server cluster.

The method and apparatus for scheduling a cloud server provided by the present disclosure relates to monitoring whether the current time is in the first pre-set time period to determine whether to schedule a cloud server in the first cloud server cluster having a running state being an idle state, as the target cloud server, to the second cloud server cluster so that the target cloud serer executes the task obtained by the second cloud server cluster, then monitoring whether the current time is in the second pre-set time period to determine whether to reschedule the target cloud server to the first cloud server cluster so that the target cloud serer executes the task obtained by the first cloud server cluster. In this way, the target cloud server is effectively scheduled to different cloud server clusters in different pre-set time periods to improve a utilization rate of the cloud server resource.

BRIEF DESCRIPTION OF THE DRAWINGS

Other features, objectives and advantages of the present disclosure will be made more apparent by reading through detailed description of unrestrictive embodiments with reference to the following figures.

DETAILED DESCRIPTION OF EMBODIMENTS

The present application will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
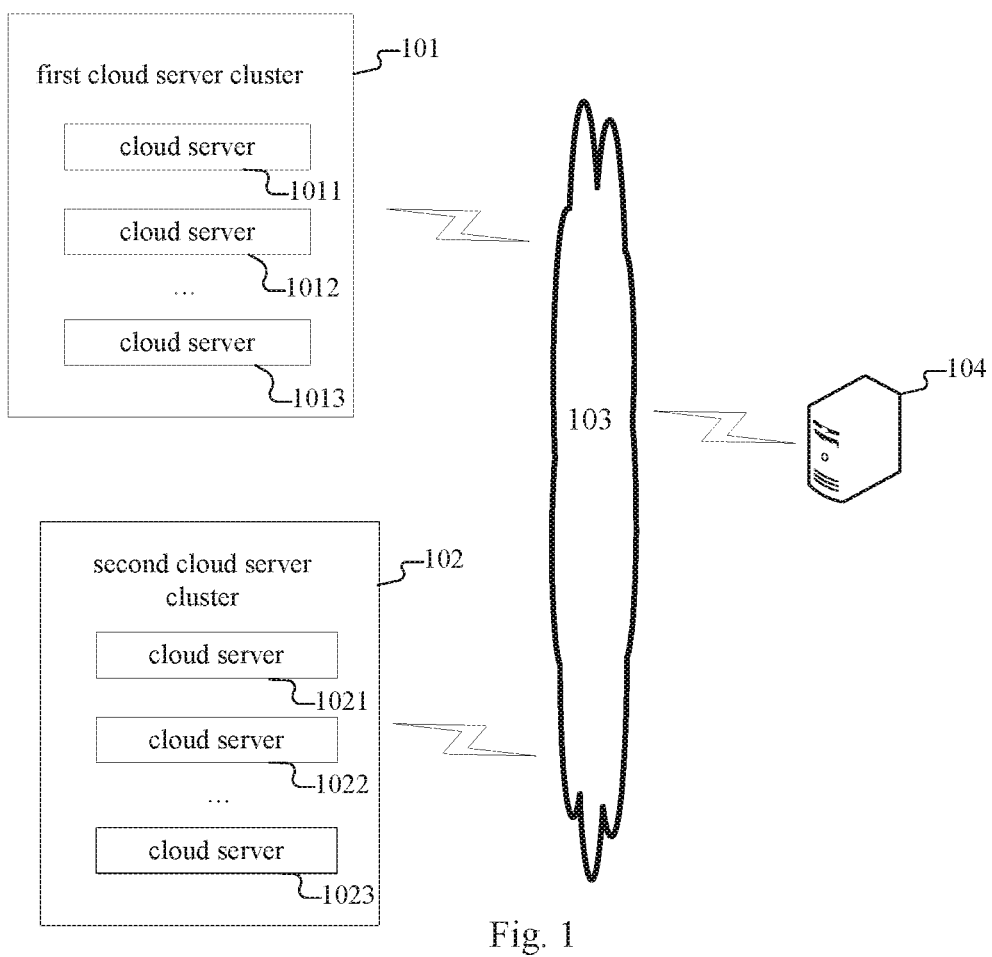
FIG. 1 illustrates an architecture of an exemplary system to which the present disclosure may be applied.

FIG. 1 illustrates an exemplary system architecture 100 to which an embodiment of a method of scheduling a cloud server or an apparatus for scheduling a cloud server according to the present disclosure may be applied.

As shown in FIG. 1, the system architecture 100 may comprise a first cloud server cluster 101, a second cloud server cluster 102, cloud servers 1011, 1012, 1013, 1021, 1022, 1023, a network 103 and a scheduling server 104. The network 103 is used to provide a medium of a communication link between the cloud servers 1011, 1012, 1013, 1021, 1022, 1023 and the scheduling server 104. The network 104 may comprise various connection types such as wired, wireless communication link or an optical fiber cable.

The cloud servers 1011, 1012, 1013 are located in the first cloud server cluster 10, and the cloud servers 1021, 1022, 1023 are located in the second cloud server cluster 102.

The scheduling server 104 interacts with the cloud servers 1011, 1012, 1013, 1021, 1022, 1023 to receive or transmit information, schedule cloud servers and the like.

The cloud servers 1011, 1012, 1013, 1021, 1022, 1023 may receive scheduling information sent from the scheduling server 104 or send a current running state information to the scheduling server 104.

The scheduling server 104 may be a server that provides various service, e.g., receive running state information from the cloud servers 1011, 1012, 1013, 1021, 1022, 1023, and schedule the above cloud servers according to received running state information.

It needs to be appreciated that the method for scheduling a cloud server provided by an embodiment of the present disclosure is generally executed by a scheduling server 104, and correspondingly an apparatus for scheduling the cloud server is generally disposed in the scheduling server 104.

It should be appreciated that the number of the first cloud server cluster, the second cloud server cluster, the cloud servers, the network and the scheduling server in FIG. 1 is only illustrative. Any number of first cloud server clusters, second cloud server clusters, cloud servers, networks and scheduling servers are possible according to needs in implementation.

Figure 2:
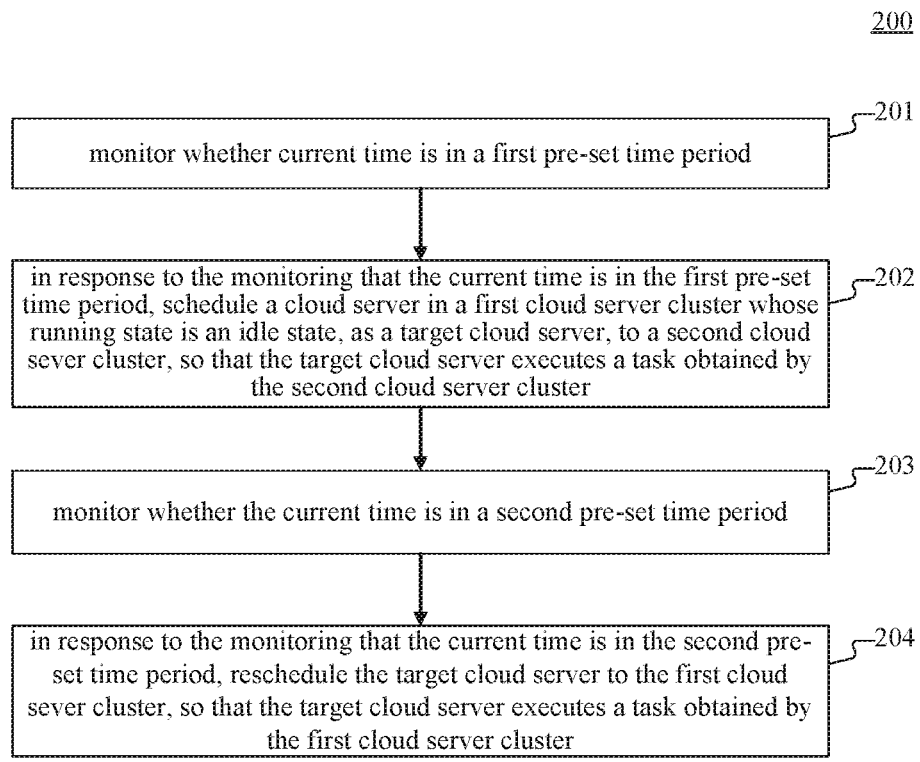
FIG. 2 illustrates a flow chart of an embodiment of a method for scheduling a cloud server according to the present disclosure.

Turning to FIG. 2, FIG. 2 illustrates a flow chart 200 of an embodiment of a method for scheduling a cloud server according to the present disclosure. The method for scheduling a cloud server comprises the following steps:

Step 201: monitoring whether current time is in a first pre-set time period.

In the present embodiment, an electronic device (e.g., the scheduling server 104 as shown in FIG. 1) on which the method for scheduling a cloud server runs may monitor whether current time is in a first pre-set time period in a wired connection approach or a wireless connection approach. It needs to be appreciated that the above wireless connection approach may comprises but is not limited to 3G/4G connection, WiFi connection, Blue-tooth connection, WiMAX connection, Zigbee connection, UWB (ultra wideband) connection, and other wireless connection approaches which are already known now and will be developed in the future.

Here, the first pre-set time period may be set artificially. For example, a system deployed on the first cloud server cluster is a mailing service system. Since the access amount of the mailing service system has a remarkable peak-valley phenomenon (with a maximum access amount in the daytime, and very little access amount before dawn), a system administrator may, according to this access phenomenon, set the first pre-set time period as 0:00-8:59 each day. The first pre-set time period may be automatically set by the electronic device. The electronic device may make statistics of the access amount of systems on the first pre-set cloud server cluster in real time or periodically, determine the first pre-set time period by judging whether the access amount resulting from statistics each time exceeds a pre-set first access amount threshold, and automatically modify the first pre-set time period, wherein the pre-set first access amount threshold may be set by the system administrator.

Step 202: in response to the monitoring that the current time is in the first pre-set time period, scheduling a cloud server in the first cloud server cluster whose running state is an idle state, as a target cloud server, to the second cloud server cluster, so that the target cloud server executes a task obtained by the second cloud server cluster.

In the present embodiment, in response to the monitoring that the current time is in the first pre-set time period in step 201, the electronic device may read, from a connected database, current running states of all cloud servers (e.g., cloud servers 1011, 1012, 1013 shown in FIG. 1) in the first cloud server cluster, and may schedule a cloud server whose current running state is an idle state, as a target cloud server, to the second cloud server cluster, so that the target cloud server executes a task obtained by the second cloud server cluster. Here, the running state may comprise an idle state and an execution state.

It needs to be appreciated that the above second cloud server cluster may be a cloud server cluster deployed with a distributed system infrastructure Hadoop computing system, and it may be used to calculate data generated when the first cloud server cluster runs. Wherein Hadoop may be a software framework capable of performing distributed processing for massive data and may perform data processing in a reliable, efficient and elastic approach. Here, the second cloud server cluster may include a master cloud server and a plurality of slave cloud servers. The master cloud server may receive an assignment submitted by the system administrator, may divide the received assignment into a plurality of tasks according to current running states of respective slave cloud servers, and allocate duly-divided tasks to the slave cloud servers which are currently in an idle state, so that the slave cloud servers execute the allocated tasks.

In some optional implementation modes of the present embodiment, before scheduling the target cloud server to the second cloud server cluster, the electronic device may first stop running the target cloud server; then, determine whether to back up a current running environment of the target cloud server, for example, determine whether to back up a current running environment of the target cloud server by determining whether a running environment backup file of the target cloud server is stored in the first cloud server cluster; in response to determining to back up the current running environment of the target cloud server, the electronic device may first back up the current running environment of the target cloud server, and then schedule the target cloud server to the second cloud server cluster. Here, after scheduling the target cloud server to the second cloud server cluster, the electronic device may first activate the target cloud server; then may use an original mirror file in the second cloud server cluster to configure the target cloud server; if the running environment backup file of the target cloud server has already been stored in the second cloud server cluster, the electronic device may also use the backup file to restore the current running environment of the target cloud server, so that the target cloud server receives a task allocated by the master cloud server in the second cloud server cluster and executes the allocated task.

In some optional implementation modes of the present embodiment, the target cloud server may perform network communication with original cloud servers (e.g., 1021, 1022, 1023 as shown in FIG. 1) in the second cloud server cluster in a first network segment. The original cloud servers in the second cloud server cluster may perform network communication in a second network segment. It needs to be appreciated that original cloud servers in the second cloud server cluster may comprise at least two network cards, wherein one network card may be configured with an IP address in the second network segment, and the other network card may be configured with an IP address in the first network segment. In an example, to enable the target cloud server to perform network communication with original cloud servers in the second cloud server cluster in the first network segment, the electronic device, after scheduling the target cloud server to the second cloud server cluster, may first determine whether the target cloud server activates IP (Internet Protocol) forwarding function, e.g., may access sysctl interface and determine whether a value of a kernel parameter "ipv4.ip_forward" under the interface is 0: if yes, may determine that the IP forwarding function has not been activated; if no, may determine that the IP forwarding function has already been activated. Here, a sysctl interface is used to configure and display kernel parameters in directory "/proc/sys", and the sysctl interface may also be used to set or reset a networking function, e.g., IP forwarding, IP fragment removal and source routing check and the like; in response to determining that the IP forwarding function has not been activated, the electronic device may amend "net.ipv4.ip_forward=0" to "net.ipv4.ip_forward=1" through "sysctl.conf" file under the directory "/etc" to permanently activate the IP forwarding function, wherein "sysctl.conf" file is a system file for storing kernel parameters; then, the electronic device may set a NAT (Network Address Translation) rule on the target cloud server. When the target cloud serer accesses the original cloud servers in the second cloud server cluster by accessing the IP address in the second network segment, a data packet received by the accessed IP address may be redirected to a corresponding IP address in the first network segment. In an example, if the first network segment is 10.0.*.*, the second network segment is 192.168.*.*, and the duly-set NAT rule may be "iptables -t nat -A OUTPUT -d 192.168.*.* -j DNAT -to-destination 10.0.*.*".

It needs to be appreciated that the above IP forwarding function and NAT rule setting are known technologies which are currently developed and applied extensively, and will not be detailed any more.

Step 203: monitoring whether the current time is in a second pre-set time period.

In the present embodiment, after the target cloud server is scheduled to the second cloud server cluster, the electronic device may monitor in real time whether the current time is in the second pre-set time period in a wired connection approach or a wireless connection approach.

It needs to be appreciated that the second pre-set time period may be set artificially. In an example, if the system deployed on the first cloud server cluster is a large-sized shopping website, the network administrator may set the second pre-set time period according to an access peak period of the network, for example, the second pre-set time period may be goods promotion time periods such as promotion time periods such as May Day, Singles' Day and New Year Day; if the system deployed on the first cloud server cluster is a mailing service system, the second pre-set time period may be 9:00-23:59 each day. Here, the second pre-set time period may be automatically set by the electronic device. The electronic device may make statistics of the access amount of systems deployed on the first cloud server cluster in real time or periodically, determine the first pre-set time period by judging whether the access amount resulting from statistics each time exceeds a pre-set second access amount threshold, and automatically modify the second pre-set time period, wherein the pre-set second access amount threshold may be set by the system administrator.

Step 204: in response to the monitoring that the current time is in the second pre-set time period, rescheduling the target cloud server to the first cloud server cluster, so that the target cloud server executes a task obtained by the first cloud server cluster.

In the present embodiment, in response to the monitoring that the current time is in the second pre-set time period in step 203, the electronic device may, after the target cloud server finishes execution of the allocated task or compulsorily terminates the run of the target cloud server, reschedule the target cloud server to the first cloud server cluster so that the target cloud server executes a task obtained by the first cloud server cluster.

In some optional implementation modes of the present embodiment, before rescheduling the target cloud server to the first cloud server cluster, the electronic device may first stop running the target cloud server; then determines whether to back up a current running environment of the target cloud server, for example, determine whether to back up a current running environment of the target cloud server by determining whether a running environment backup file of the target cloud server is stored in the second cloud server cluster; in response to determining to back up the current running environment of the target cloud server, the electronic device may first back up the current running environment of the target cloud server, and then schedule the target cloud server to the first cloud server cluster. Here, after scheduling the target cloud server to the first cloud server cluster, the electronic device may first activate the target cloud server; then restore the current running environment of the target cloud server to the backup cloud server, or re-configure the current running environment of the target cloud server according to actual needs, so that the target cloud server executes a task obtained by the first cloud server cluster.

Figure 3:
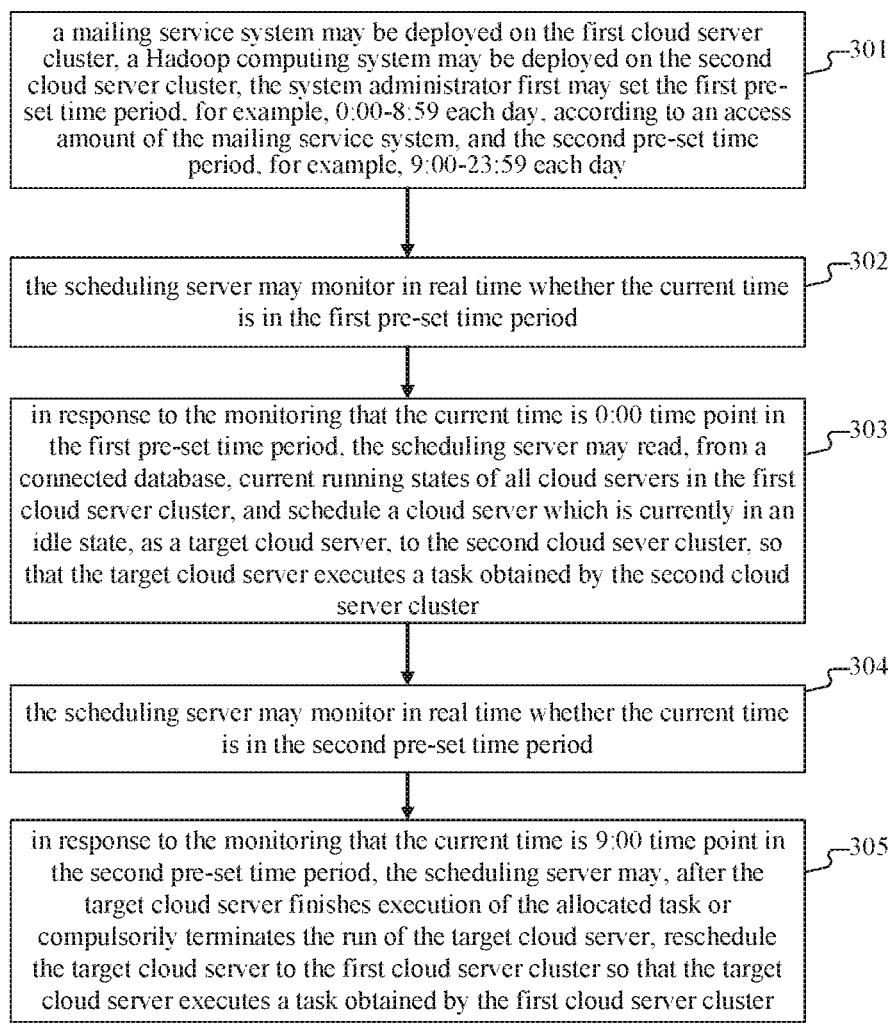
FIG. 3 illustrates a schematic diagram of an application scenario of a method for scheduling a cloud server according to the present disclosure.

Turning to FIG. 3, FIG. 3 illustrates a schematic diagram of an application scenario of a method for scheduling a cloud server according to the present disclosure. In the application scenario shown in FIG. 3, as shown in the reference number 301, a mailing service system may be deployed on the first cloud server cluster, a Hadoop computing system may be deployed on the second cloud server cluster, the user first may set the first pre-set time period, for example, 0:00-8:59 each day, according to an access amount of the mailing service system, and the second pre-set time period, for example, 9:00-23:59 each day; then, as shown by the reference number 302, the scheduling server may monitor in real time whether the current time is in the first pre-set time period; then, as shown by the reference number 303, in response to the monitoring that the current time is 0:00 time point in the first pre-set time period, the scheduling server may read, from a connected database, current running states of all cloud servers in the first cloud server cluster, and schedule a cloud server which is currently in an idle state, as a target cloud server, to the second cloud server cluster, so that the target cloud server executes a task obtained by the second cloud server cluster. Then, as shown by the reference number 304, the scheduling server may monitor in real time whether the current time is in the second pre-set time period; finally, as shown by the reference number 305, in response to the monitoring that the current time is 9:00 time point in the second pre-set time period, the scheduling server may, after the target cloud server finishes execution of the allocated task or compulsorily terminates the run of the target cloud server, reschedule the target cloud server to the first cloud server cluster so that the target cloud server executes a task obtained by the first cloud server cluster.

The method provided by the above embodiment of the present disclosure relates to monitoring in real time whether the current time is in the first pre-set time period to determine whether to schedule a cloud server in the first cloud server cluster whose running state is an idle state, as the target cloud server, to the second cloud server cluster so that the target cloud serer executes the task obtained by the second cloud server cluster, then monitoring in real time whether the current time is in the second pre-set time period to determine whether to reschedule the target cloud server to the first cloud server cluster so that the target cloud serer executes the task obtained by the first cloud server cluster. In this way, the target cloud server is effectively scheduled to different cloud server clusters in different pre-set time periods to improve a utilization rate of the cloud server resource.

Figure 4:
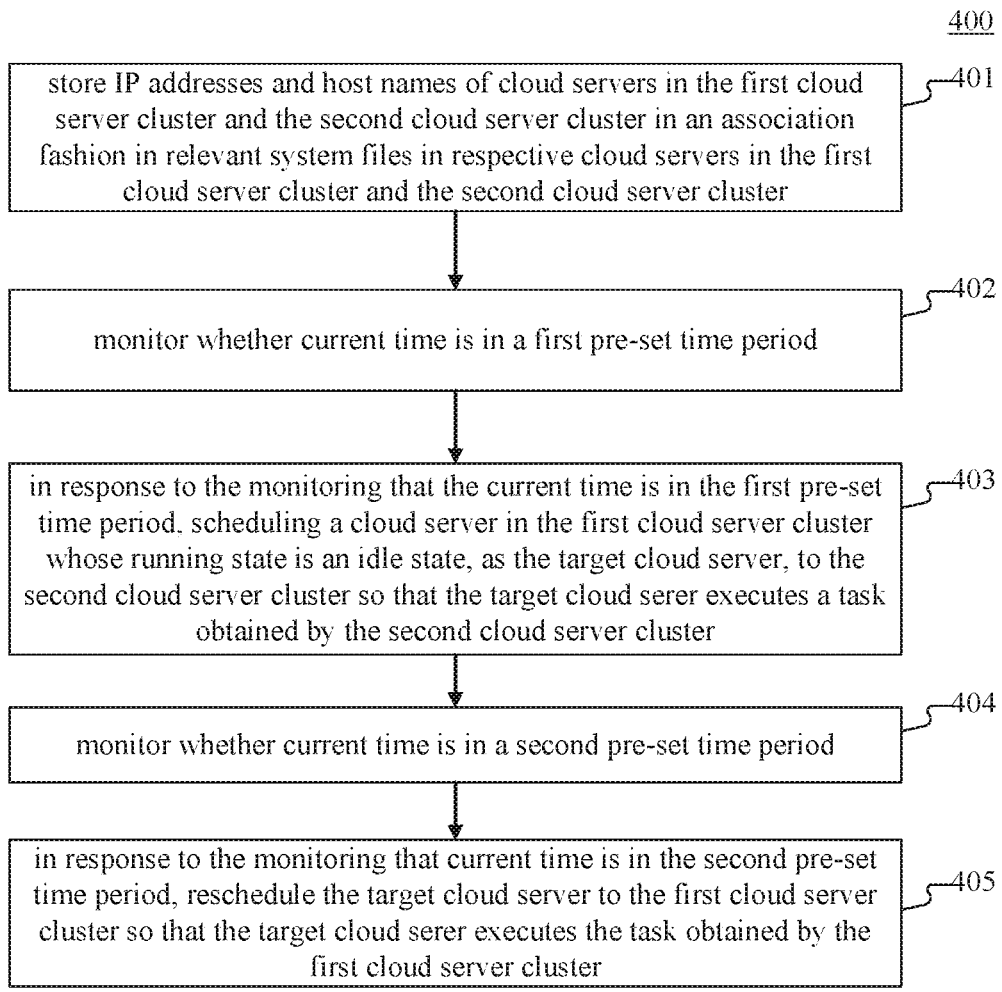
FIG. 4 illustrates a flow chart of another embodiment of a method for scheduling a cloud server according to the present disclosure.

Further referring to FIG. 4, FIG. 4 illustrates a flow chart 400 of a further embodiment of a method for scheduling a cloud server according to the present disclosure. The flow chart 400 of the method for scheduling a cloud server comprises the following steps:

Step 401: storing, IP addresses and host names of cloud servers in the first cloud server cluster and second cloud server cluster in an associated fashion in relevant system files in the respective cloud servers in the first cloud server cluster and the second cloud server cluster.

In the present embodiment, to enable the respective cloud servers (e.g., cloud servers 1011, 1012, 1013, 1021, 1022, 1023) in the first cloud server cluster and the second cloud server cluster to access each other through machine names, an electronic device (e.g., the scheduling server 104 as shown in FIG. 1) on which the method for scheduling a cloud server runs may acquire, from the connected database, the IP addresses and host names of the respective cloud servers in the first cloud server cluster and the second cloud server cluster, and may store, in an associated fashion, the acquired IP addresses and host names of the respective cloud servers in system files hosts files of respective cloud servers.

Step 402: monitoring whether current time is in a first pre-set time period.

In the present embodiment, the electronic device may monitor in real time whether current time is in the first pre-set time period in a wired connection approach or a wireless connection approach, wherein the first pre-set time period may be set artificially, or may be automatically set by the electronic device according to the access amount of the system deployed on the first cloud server cluster.

Step 403: in response to the monitoring that the current time is in the first pre-set time period, scheduling a cloud server in the first cloud server cluster whose running state is an idle state, as the target cloud server, to the second cloud server cluster so that the target cloud serer executes the task obtained by the second cloud server cluster.

In the present embodiment, in response to the monitoring that the current time is in the first pre-set time period in step 403, the electronic device may read current running states of respective cloud servers in the first cloud server cluster from the connected database; then stop running the cloud server which is currently in the idle state, and schedule it as the target cloud server to the second cloud server cluster; then, configure a desired running environment for the target cloud server to enable it to receive and execute the task allocated by the master cloud serer in the second cloud server cluster.

Step 404: monitoring whether current time is in a second pre-set time period.

In the present embodiment, after scheduling the target cloud server to the second cloud server cluster, the electronic device monitors in real time whether current time is in the second pre-set time period in a wired connection approach or a wireless connection approach. It needs to be appreciated that the second pre-set time period may be set artificially, or may be automatically set by the electronic device according to the access amount of the system deployed on the first cloud server cluster.

Step 405: in response to the monitoring that current time is in the second pre-set time period, rescheduling the target cloud server to the first cloud server cluster so that the target cloud serer executes the task obtained by the first cloud server cluster.

In the present embodiment, in response to the monitoring that the current time is in the second pre-set time period in step 404, the electronic device may, after the target cloud server finishes execution of the allocated task or compulsorily terminates the run of the target cloud server, then reschedule the target cloud server to the first cloud server cluster; configure the current running environment of the target cloud server so that the target cloud server executes a task obtained by the first cloud server cluster.

As can be seen from FIG. 4, as compared with the embodiment corresponding to FIG. 2, the flow chart 400 of the method for scheduling a cloud server in the present embodiment highlights the step of storing IP addresses and host names of cloud servers in the first cloud server cluster and the second cloud server cluster in relevant system files in an associated fashion in the respective cloud servers in the first cloud server cluster and the second cloud server cluster. Therefore, the solution described in the present embodiment may implement flexibility of mutual access between respective cloud servers in the first cloud server cluster and the second cloud server cluster, thereby further improving access efficiency of respective cloud servers and improving a utilization rate of the cloud server resources.

Figure 5:
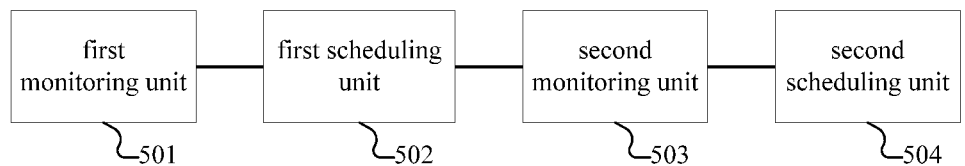
FIG. 5 illustrates a structural schematic diagram of an embodiment of an apparatus for scheduling a cloud server according to the present disclosure.

Now referring to FIG. 5, as an implementation of the methods shown in the above figures, the present disclosure provides an embodiment of an apparatus for scheduling a cloud server. The apparatus embodiment corresponds to the method embodiment shown in FIG. 2, and the apparatus specifically may be applied to various electronic devices.

As shown in FIG. 5, the apparatus 500 for scheduling a cloud server according to the present embodiment comprises: a first monitoring unit 501, a first scheduling unit 502, a second monitoring unit 503 and a second scheduling unit 504, wherein the first monitoring unit 501 is configured to monitor whether the current time is in a first pre-set time period, the first scheduling unit 502 is configured to, in response to the monitoring that the current time is in the first pre-set time period, schedule a cloud server in the first cloud server cluster whose running state is an idle state, as a target cloud server, to the second cloud server cluster, so that the target cloud server executes a task obtained by the second cloud server cluster; the second monitoring unit 503 is configured to monitor whether the current time is in a second pre-set time period; the second scheduling unit 504 is configured to, in response to the monitoring that the current time is in the second pre-set time period, reschedule the target cloud server to the first cloud server cluster, so that the target cloud server executes a task obtained by the first cloud server cluster.

In the apparatus 500 for scheduling the cloud server, reference may be made to relevant depictions of implementation modes of step 201, step 202, step 203 and step 204 in the embodiment corresponding to FIG. 2 for specific processing and resultant advantageous effects of the first monitoring unit 501, the first scheduling unit 502, the second monitoring unit 503 and the second scheduling unit 504. No detailed description will be presented here.

In some optional implementation modes of the present embodiment, the first scheduling unit 502 may comprise: a first backup subunit (not shown in the figure) configured to, before scheduling the target cloud server to the second cloud server cluster, stop running the target cloud server, and determine whether to back up a current running environment of the target cloud server, and if yes, back up the current running environment of the target cloud server; a first configuration subunit (not shown in the figure) configured to, after scheduling the target cloud server to the second cloud server cluster, activate the target cloud server, and configure a desired running environment to execute a task obtained by the second cloud server cluster.

In some optional implementation modes of the present embodiment, in the apparatus 500 for scheduling the cloud server, the target cloud server performs network communication with the original cloud servers in the second cloud server cluster in a first network segment, and the original cloud servers in the second cloud server cluster may perform network communication in a second network segment.

In some optional implementation modes of the present embodiment, the first configuration subunit may comprise: a determining module (not shown in the figure) configured to determine whether to activate an IP forwarding function on the target cloud server; an IP forwarding module (not shown in the figure) configured to, in response to determining that the IP forwarding function has not been activated on the target cloud server, activate the IP forwarding function on the target cloud server, and when the target cloud serer accesses the original cloud servers in the second cloud server cluster by accessing the IP address in the second network segment, redirect a data packet received by the accessed IP address to a corresponding IP address in the first network segment.

In some optional implementation modes of the present embodiment, the second scheduling unit may comprise: a second backup subset (not shown in the figure) configured to, before rescheduling the target cloud server to the first cloud server cluster, determine whether to back up a current running environment of the target cloud server, and if yes, back up a current running environment of the target cloud server; a second configuration subunit (not shown in the figure) configured to, after rescheduling the target cloud server to the first cloud server cluster, activate the target cloud server, and restore the current running environment of the target cloud server to the backup running environment or re-configure the current running environment of the target cloud server.

In some optional implementation modes of the present embodiment, the apparatus 500 for scheduling the cloud server may further comprise: a storage unit (not shown in the figure) configured to store IP addresses and host names of cloud servers in the first cloud server cluster and the second cloud server cluster in an associated fashion in relevant system files in respective cloud servers in the first cloud server cluster and the second cloud server cluster.

Figure 6:
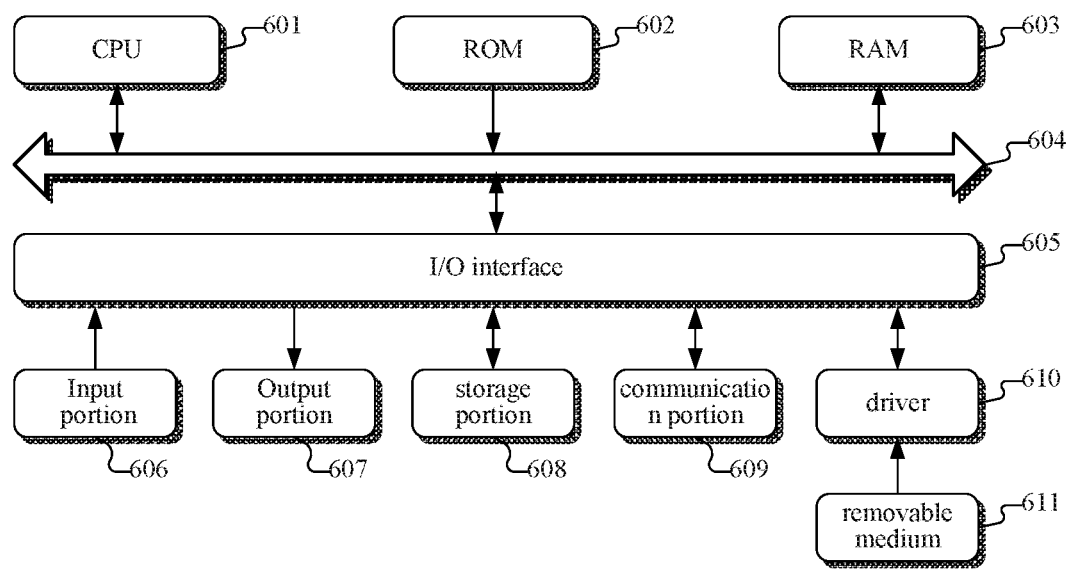
FIG. 6 illustrates a structural schematic diagram of a computer system of a server adapted to implement an embodiment of the present disclosure.

Referring to FIG. 6, a schematic structural diagram of a computer system 600 adapted to implement a server of the embodiments of the present application is shown.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to an embodiment of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 609, and/or may be installed from the removable media 611. The computer program, when executed by the CPU 601, implements the functions as defined by the methods of the present disclosure.

The flowcharts and block diagrams in the figures illustrate architectures, functions and operations that may be implemented according to the system, the method and the computer program product of the various embodiments of the present invention. In this regard, each block in the flowcharts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units or modules involved in the embodiments of the present application may be implemented by way of software or hardware. The described units or modules may also be provided in a processor, for example, described as: a processor, comprising a first monitoring unit, a first scheduling unit, a second monitoring unit and a second scheduling unit, where the names of these units or modules are not considered as a limitation to the units or modules. For example, the first monitoring unit may also be described as "a unit for monitoring whether the current time is in a first pre-set time period."

In another aspect, the present application further provides a non-volatile computer storage medium. The non-volatile computer storage medium may be the non-volatile computer storage medium included in the apparatus in the above embodiments, or a stand-alone non-volatile computer storage medium which has not been assembled into the apparatus. The non-volatile computer storage medium stores one or more programs. The one or more programs, when executed by a device, cause the device to: monitor whether current time is in a first pre-set time period; schedule, in response to the monitoring the current time being in the first pre-set time period, a cloud server in a first cloud server cluster having a running state being an idle state, as a target cloud server to a second cloud server cluster, so that the target cloud server executes a task obtained by the second cloud server cluster; monitor whether the current time is in a second pre-set time period; reschedule, in response to the monitoring the current time being in the second pre-set time period, the target cloud server to the first cloud server cluster, so that the target cloud server executes a task obtained by the first cloud server cluster.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A method for scheduling a cloud server, comprising:
monitoring whether current time is in a first pre-set time period;
scheduling, in response to the monitoring the current time being in the first pre-set time period, a cloud server in a first cloud server cluster having a running state being an idle state, as a target cloud server to a second cloud server cluster, so that the target cloud server executes a task obtained by the second cloud server cluster;
monitoring whether the current time is in a second pre-set time period;
rescheduling, in response to the monitoring the current time being in the second pre-set time period, the target cloud server to the first cloud server cluster, so that the target cloud server executes a task obtained by the first cloud server cluster;
wherein the scheduling comprises:
stopping, before scheduling the target cloud server to the second cloud server cluster, running the target cloud server, determining whether to back up a current running environment of the target cloud server, and if yes, backing up the current running environment of the target cloud server; and
activating the target cloud server, after scheduling the target cloud server to the second cloud server cluster, and configuring a desired running environment to execute a task obtained by the second cloud server cluster;
wherein the rescheduling comprises:
determining, before rescheduling the target cloud server to the first cloud server cluster, whether to back up the current running environment of the target cloud server, and if yes, backing up the current running environment of the target cloud server; and
activating, after rescheduling the target cloud server to the first cloud server cluster, the target cloud server, and restoring the current running environment of the target cloud server to the backup running environment or re-configuring the current running environment of the target cloud server.

2. The method according to claim 1, wherein the target cloud server performs network communication with original cloud servers in the second cloud server cluster in a first network segment, and the original cloud servers in the second cloud server cluster perform network communication in a second network segment.

3. The method according to claim 2, wherein the activating the target cloud server, after the scheduling the target cloud server to the second cloud server cluster, and configuring a desired running environment to execute a task obtained by the second cloud server cluster comprises:
determining whether to activate an IP forwarding function on the target cloud server; and
activating, in response to determining the IP forwarding function being not activated on the target cloud server, the IP forwarding function on the target cloud server, and when the target cloud serer accesses the original cloud servers in the second cloud server cluster by accessing the IP address in the second network segment, redirecting a data packet received by the accessed IP address to a corresponding IP address in the first network segment.

4. The method according to claim 1, wherein, before monitoring whether current time is in the first pre-set time period, the method further comprises:
storing, upon deploying systems in the first cloud server cluster and the second cloud server cluster, IP addresses and host names of the cloud servers in the first cloud server cluster and the second cloud server cluster in an associated fashion in relevant system files in the respective cloud servers in the first cloud server cluster and the second cloud server cluster.

5. An apparatus for scheduling a cloud server, comprising:
at least one processor; and
a memory storing instructions, which when executed by the at least one processor, cause the at least one processor to perform operations, the operations comprising:
monitoring, by a first monitoring unit, whether the current time is in a first pre-set time period;
scheduling, by a first scheduling unit, in response to the monitoring the current time being in the first pre-set time period, a cloud server in a first cloud server cluster having a running state being an idle state, as a target cloud server, to a second cloud server cluster, so that the target cloud server executes a task obtained by the second cloud server cluster;
monitoring, by a second monitoring unit, whether the current time is in a second pre-set time period;
scheduling, by a second scheduling unit, in response to the monitoring the current time being in the second pre-set time period, the target cloud server to the first cloud server cluster, so that the target cloud server executes a task obtained by the first cloud server cluster;
wherein the scheduling comprises:
stopping, before scheduling the target cloud server to the second cloud server cluster, running the target cloud server, and determine whether to back up a current running environment of the target cloud server, and if yes, backup the current running environment of the target cloud server; and
activating, after scheduling the target cloud server to the second cloud server cluster, the target cloud server, and configure a desired running environment to execute a task obtained by the second cloud server cluster;
wherein the rescheduling comprises:
determining, before rescheduling the target cloud server to the first cloud server cluster, whether to back up a current running environment of the target cloud server, and if yes, back up a current running environment of the target cloud server; and activating, after rescheduling the target cloud server to the first cloud server cluster, the target cloud server, and restore the current running environment of the target cloud server to the backup running environment or re-configure the current running environment of the target cloud server.

6. The apparatus according to claim 5, wherein the target cloud server performs network communication with original cloud servers in the second cloud server cluster in a first network segment, and the original cloud servers in the second cloud server cluster perform network communication in a second network segment.

7. The apparatus according to claim 6, wherein the activating the target cloud server, after the scheduling the target cloud server to the second cloud server cluster, and configuring a desired running environment to execute a task obtained by the second cloud server cluster comprises:

determining whether to activate an IP forwarding function on the target cloud server; and activating, in response to determining that the IP forwarding function has not been activated on the target cloud server, the IP forwarding function on the target cloud server, and when the target cloud serer accesses the original cloud servers in the second cloud server cluster by accessing the IP address in the second network segment, redirect a data packet received by the accessed IP address to a corresponding IP address in the first network segment.

8. The apparatus according to claim 5, wherein, before monitoring whether current time is in the first pre-set time period, the method further comprises:

storing, upon deploying systems on the first cloud server cluster and the second cloud server cluster, IP addresses and host names of cloud servers in the first cloud server cluster and the second cloud server cluster in an associated fashion in relevant system files in respective cloud servers in the first cloud server cluster and the second cloud server cluster.

9. A non-transitory computer storage medium storing a computer program, which when executed by one or more processors, cause the one or more processors to perform operations, the operations comprising:

monitoring whether current time is in a first pre-set time period;

scheduling, in response to the monitoring the current time being in the first pre-set time period, a cloud server in a first cloud server cluster having a running state being an idle state, as a target cloud server to a second cloud server cluster, so that the target cloud server executes a task obtained by the second cloud server cluster;

monitoring whether the current time is in a second pre-set time period;

rescheduling, in response to the monitoring the current time being in the second pre-set time period, the target cloud server to the first cloud server cluster, so that the target cloud server executes a task obtained by the first cloud server cluster;

wherein the scheduling comprises:

stopping, before scheduling the target cloud server to the second cloud server cluster, running the target cloud server, determining whether to back up a current running environment of the target cloud server, and if yes, backing up the current running environment of the target cloud server; and activating the target cloud server, after scheduling the target cloud server to the second cloud server cluster, and configuring a desired running environment to execute a task obtained by the second cloud server cluster;

wherein the rescheduling comprises:

determining, before rescheduling the target cloud server to the first cloud server cluster, whether to back up the current running environment of the target cloud server, and if yes, backing up the current running environment of the target cloud server; and activating, after rescheduling the target cloud server to the first cloud server cluster, the target cloud server, and restoring the current running environment of the target cloud server to the backup running environment or re-configuring the current running environment of the target cloud server.

10. The non-transitory computer storage medium according to claim 9, wherein the target cloud server performs network communication with original cloud servers in the second cloud server cluster in a first network segment, and the original cloud servers in the second cloud server cluster perform network communication in a second network segment.

11. The non-transitory computer storage medium according to claim 10, wherein the activating the target cloud server, after the scheduling the target cloud server to the second cloud server cluster, and configuring a desired running environment to execute a task obtained by the second cloud server cluster comprises:

determining whether to activate an IP forwarding function on the target cloud server;

activating, in response to determining the IP forwarding function being not activated on the target cloud server, the IP forwarding function on the target cloud server, and when the target cloud serer accesses the original cloud servers in the second cloud server cluster by accessing the IP address in the second network segment, redirecting a data packet received by the accessed IP address to a corresponding IP address in the first network segment.

12. The non-transitory computer storage medium according to claim 9, wherein, before monitoring whether current time is in the first pre-set time period, the method further comprises:

storing, upon deploying systems in the first cloud server cluster and the second cloud server cluster, IP addresses and host names of the cloud servers in the first cloud server cluster and the second cloud server cluster in an associated fashion in relevant system files in the respective cloud servers in the first cloud server cluster and the second cloud server cluster.

* * * * *